(12) United States Patent
Kim et al.

(10) Patent No.: US 11,037,500 B2
(45) Date of Patent: Jun. 15, 2021

(54) DISPLAY APPARATUS HAVING DIFFERENT GATE SIGNAL APPLYING TIMINGS AND METHOD OF DRIVING DISPLAY PANEL USING THE SAME

(71) Applicant: Samsung Display Co., Ltd., Yongin-si (KR)

(72) Inventors: Jung-Taek Kim, Seoul (KR); Hyun Myoung Seo, Cheonan-si (KR); Hyun Chul Chun, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/529,584

(22) Filed: Aug. 1, 2019

(65) Prior Publication Data

US 2020/0043418 A1 Feb. 6, 2020

(30) Foreign Application Priority Data

Aug. 1, 2018 (KR) .................. 10-2018-0089935

(51) Int. Cl.
*G09G 3/3266* (2016.01)
*G09G 3/3275* (2016.01)
*G09G 3/20* (2006.01)
*G09G 3/3258* (2016.01)
*G06T 7/00* (2017.01)

(52) U.S. Cl.
CPC ......... *G09G 3/3266* (2013.01); *G09G 3/2018* (2013.01); *G09G 3/3258* (2013.01); *G09G 3/3275* (2013.01); *G06T 7/97* (2017.01); *G09G 2300/0426* (2013.01);

(Continued)

(58) Field of Classification Search
CPC .............. G06T 7/97; G09G 2300/0426; G09G 2300/0809; G09G 2300/0819; G09G 2310/0251; G09G 2310/0262; G09G 2310/06; G09G 2310/08; G09G 2320/0257; G09G 2320/045; G09G 2320/066; G09G 2320/0673; G09G 2320/103; G09G 3/2018; G09G 3/2092; G09G 3/3258; G09G 3/3266; G09G 3/3275

See application file for complete search history.

(56) References Cited

U.S. PATENT DOCUMENTS 10,004,124 B1 * 6/2018 Ko ................... G09G 3/3233
2012/0044239 A1 * 2/2012 Asano ............... G09G 3/3241
345/212

(Continued)

FOREIGN PATENT DOCUMENTS

KR       10-1589901 B1    1/2016
KR    10-2016-0130066 A   11/2016
KR    10-2018-0003790 A    1/2018

*Primary Examiner* — Chun-Nan Lin
(74) *Attorney, Agent, or Firm* — Lewis Roca Rothgerber Christie LLP

(57) ABSTRACT

A display apparatus includes a display panel, a gate driver, a data driver and an emission driver. The display panel is configured to display an image. The gate driver is configured to output a gate signal having different applying timings for frames according to a difference between a grayscale value of a present frame image and a grayscale value of a previous frame image to the display panel. The data driver is configured to output a data voltage to the display panel. The emission driver is configured to output an emission signal to the display panel.

20 Claims, 11 Drawing Sheets

(52) U.S. Cl.
CPC . *G09G 2300/0809* (2013.01); *G09G 2310/08* (2013.01); *G09G 2320/0257* (2013.01)

(56) References Cited

U.S. PATENT DOCUMENTS

2017/0092191 A1\* 3/2017 An .................. G09G 3/3233
2018/0081491 A1\* 3/2018 Holland ............ G06F 3/0418

\* cited by examiner

DISPLAY APPARATUS HAVING DIFFERENT GATE SIGNAL APPLYING TIMINGS AND METHOD OF DRIVING DISPLAY PANEL USING THE SAME

CROSS-REFERENCE TO RELATED APPLICATION

This application claims priority to and the benefit of Korean Patent Application No. 10-2018-0089935, filed on Aug. 1, 2018 in the Korean Intellectual Property Office (KIPO), the contents of which are herein incorporated by reference in their entireties.

BACKGROUND

1. Field

Exemplary embodiments of the present inventive concept relate to a display apparatus and a method of driving a display panel using the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

The display panel includes the plurality of pixels and each pixel includes a plurality of switching elements. According to a bias of the switching element, a current-voltage curve of the switching element may be shifted. Due to the shift of the current-voltage curve of the switching element, an undesirable afterimage may be generated.

A hysteresis of the switching element may be compensated for to prevent the afterimage. A gate initializing signal may be applied to the pixels of the display panel to compensate the hysteresis of the switching element. However, when the display panel displays a low grayscale level image, some of pixels may not be turned on due to the compensation to the hysteresis of the switching element.

SUMMARY

Exemplary embodiments of the present inventive concept provide a display apparatus capable of enhancing a display quality of a display panel.

Exemplary embodiments of the present inventive concept also provide a method of driving a display panel using the display apparatus.

In an exemplary embodiment of a display apparatus according to the present inventive concept, the display apparatus includes a display panel, a gate driver, a data driver and an emission driver. The display panel is configured to display an image. The gate driver is configured to output a gate signal having different applying timings for frames according to a difference between a grayscale value of a present frame image and a grayscale value of a previous frame image to the display panel. The data driver is configured to output a data voltage to the display panel. The emission driver is configured to output an emission signal to the display panel.

In an exemplary embodiment, as the difference between the grayscale value of the present frame image and the grayscale value of the previous frame image is greater, the applying timing of the gate signal may be in a later region of an inactive period of the emission signal.

In an exemplary embodiment, when the grayscale value of the present frame image is equal to or less than the grayscale value of the previous frame image, the gate driver may be configured to output the gate signal having the same applying timing for frames regardless of the difference between the grayscale value of the present frame image and the grayscale value of the previous frame image. When the grayscale value of the present frame image is greater than the grayscale value of the previous frame image, the gate driver may be configured to output the gate signal in different applying timings for frames according to the difference between the grayscale value of the present frame image and the grayscale value of the previous frame image.

In an exemplary embodiment, the grayscale value of the present frame image may correspond to an entire area of the display panel. The grayscale value of the previous frame image may correspond to the entire area of the display panel.

In an exemplary embodiment, the grayscale value of the present frame image may correspond to a central portion area of the display panel. The grayscale value of the previous frame image may correspond to the central portion of the display panel.

In an exemplary embodiment, the gate driver may be configured to output a data write gate signal, a data initialization gate signal, and an organic light emitting element initialization gate signal to the display panel in an inactive period of the emission signal.

In an exemplary embodiment, the gate driver may be configured to output the data write gate signal to a pixel of the display panel after the data initialization gate signal is outputted to the pixel of the display panel.

In an exemplary embodiment, the gate driver may be configured to simultaneously output the data write gate signal, and the organic light emitting element initialization gate signal to the pixel of the display panel.

In an exemplary embodiment, the gate driver may be configured to output a plurality of pulses of the data write gate signal, a plurality of pulses of the data initialization gate signal, and a plurality of pulses of the organic light emitting element initialization gate signal to the pixel in a single inactive period of the emission signal.

In an exemplary embodiment, the gate driver may be configured to output a single pulse of the data write gate signal, a single pulse of the data initialization gate signal, and a single pulse of the organic light emitting element initialization gate signal to the pixel in a single inactive period of the emission signal.

In an exemplary embodiment, the display apparatus may further include a driving controller configured to adjust a driving timing of the gate driver. The driving controller may include an image analyzer configured to analyze an input image data, a contrast difference calculator configured to determine the difference between the grayscale value of the present frame image and the grayscale value of the previous frame image and a timing determiner configured to generate a gate timing control signal determining the applying timing of the gate signal according to the difference between the grayscale value of the present frame image and the grayscale value of the previous frame image.

In an exemplary embodiment, the timing determiner may be configured to determine the gate timing control signal as a first value when the difference between the grayscale value of the present frame image and the grayscale value of the previous frame image is equal to or less than a first threshold value. The timing determiner may be configured to linearly determine the gate timing control signal between the first value and a second value greater than the first value when the difference between the grayscale value of the present frame image and the grayscale value of the previous frame image is greater than the first threshold value and equal to or less than a second threshold value. The timing determiner may be configured to determine the gate timing control signal as the second value when the difference between the grayscale value of the present frame image and the grayscale value of the previous frame image is greater than the second threshold value.

In an exemplary embodiment, the display panel may include a plurality of pixels. Each pixel may include an organic light emitting element. Each pixel may be configured to receive a data write gate signal, a data initialization gate signal, an organic light emitting element initialization gate signal, the data voltage, and the emission signal, and to emit the organic light emitting element to display the image.

In an exemplary embodiment, at least one of the pixels may include a first pixel switching element comprising a control electrode connected to a first node, an input electrode connected to a second node, and an output electrode connected to a third node, a second pixel switching element comprising a control electrode to which the data write gate signal is applied, an input electrode to which the data voltage is applied, and an output electrode connected to the second node, a third pixel switching element comprising a control electrode to which the data write gate signal is applied, an input electrode connected to the first node, and an output electrode connected to the third node, a fourth pixel switching element comprising a control electrode to which the data initialization gate signal is applied, an input electrode to which an initialization voltage is applied, and an output electrode connected to the first node, a fifth pixel switching element comprising a control electrode to which the emission signal is applied, an input electrode to which a first power voltage is applied, and an output electrode connected to the second node, a sixth pixel switching element comprising a control electrode to which the emission signal is applied, an input electrode connected to the third node, and an output electrode connected to an anode electrode of the organic light emitting element, a seventh pixel switching element comprising a control electrode to which the organic light emitting element initialization gate signal is applied, an input electrode to which the initialization voltage is applied, and an output electrode connected to the anode electrode of the organic light emitting element, a storage capacitor comprising a first electrode to which the first power voltage is applied, and a second electrode connected to the first node, and the organic light emitting element comprising the anode electrode, and a cathode electrode to which a second power voltage is applied.

In an exemplary embodiment, at least one of the pixels may include a first pixel switching element comprising a control electrode connected to a first node, an input electrode connected to a second node, and an output electrode connected to a third node, a second pixel switching element comprising a control electrode to which the data write gate signal is applied, an input electrode to which the data voltage is applied, and an output electrode connected to the second node, a 3-1 pixel switching element comprising a control electrode to which the data write gate signal is applied, an input electrode connected to the first node, and an output electrode connected to an input electrode of a 3-2 pixel switching elements, the 3-2 pixel switching element comprising a control electrode to which the data write gate signal is applied, an input electrode connected to the output electrode of the 3-1 pixel switching element, and an output electrode connected to the third node, a 4-1 pixel switching element comprising a control electrode to which the data initialization gate signal is applied, an input electrode connected to an output electrode of a 4-2 pixel switching element, and an output electrode connected to the first node, the 4-2 pixel switching element 2 comprising a control electrode to which the data initialization gate signal is applied, an input electrode to which an initialization voltage is applied, and an output electrode connected to the input electrode of the 4-1 pixel switching element, a fifth pixel switching element comprising a control electrode to which the emission signal is applied, an input electrode to which a first power voltage is applied, and an output electrode connected to the second node, a sixth pixel switching element comprising a control electrode to which the emission signal is applied, an input electrode connected to the third node, and an output electrode connected to an anode electrode of the organic light emitting element, a seventh pixel switching element comprising a control electrode to which the organic light emitting element initialization gate signal is applied, an input electrode to which the initialization voltage is applied, and an output electrode connected to the anode electrode of the organic light emitting element, a storage capacitor comprising a first electrode to which the first power voltage is applied, and a second electrode connected to the first node, and the organic light emitting element comprising the anode electrode, and a cathode electrode to which a second power voltage is applied.

In an exemplary embodiment of a method of driving a display panel, the method includes outputting a gate signal having different applying timings for frames according to a difference between a grayscale value of a present frame image and a grayscale value of a previous frame image to the display panel, outputting a data voltage to the display panel and outputting an emission signal to the display panel.

In an exemplary embodiment, when the difference between the grayscale value of the present frame image and the grayscale value of the previous frame image is great, the applying timing of the gate signal may be late in an inactive period of the emission signal.

In an exemplary embodiment, when the grayscale value of the present frame image is equal to or less than and the grayscale value of the previous frame image, the gate signal having the same applying timing for frames may be outputted to the display panel regardless of the difference between the grayscale value of the present frame image and the grayscale value of the previous frame image. When the grayscale value of the present frame image is greater than the grayscale value of the previous frame image, the gate signal may be outputted to the display panel in different applying timings for frames according to the difference between the grayscale value of the present frame image and the grayscale value of the previous frame image.

In an exemplary embodiment, the grayscale value of the present frame image may correspond to an entire area of the display panel. The grayscale value of the previous frame image may correspond to the entire area of the display panel.

In an exemplary embodiment, the grayscale value of the present frame image may correspond to a central portion area of the display panel. The grayscale value of the previous frame image may correspond to the central portion of the display panel.

According to the display apparatus and the method of driving the display panel, the input image is analyzed in each frame so that the applying timing of the gate signal may be adjusted in the inactive period of the emission signal according to the difference between the grayscale value of the present frame image and the grayscale value of the previous frame image.

As the difference between the grayscale value of the present frame image and the grayscale value of the previous frame image is relatively greater, the applying timing of the gate signal may be adjusted to be in a later region in the inactive period of the emission signal so that the display defect due to the turned-off switching elements in the low grayscale driving may be reduced or prevented.

When the difference between the grayscale value of the present frame image and the grayscale value of the previous frame image is relatively small, the applying timing of the gate signal may be adjusted to be in an early region in the inactive period of the emission signal so that the afterimage due to the hysteresis of the switching element may be reduced or prevented.

Therefore, the display defect due to the turned-off switching elements and the afterimage due to the hysteresis of the switching element may be effectively reduced or prevented so that the display quality of the display panel may be enhanced.

BRIEF DESCRIPTION OF THE DRAWINGS

The above and other features and aspects of the present inventive concept will become more apparent by describing in detailed exemplary embodiments thereof with reference to the accompanying drawings, in which.

DETAILED DESCRIPTION

Figure 1:
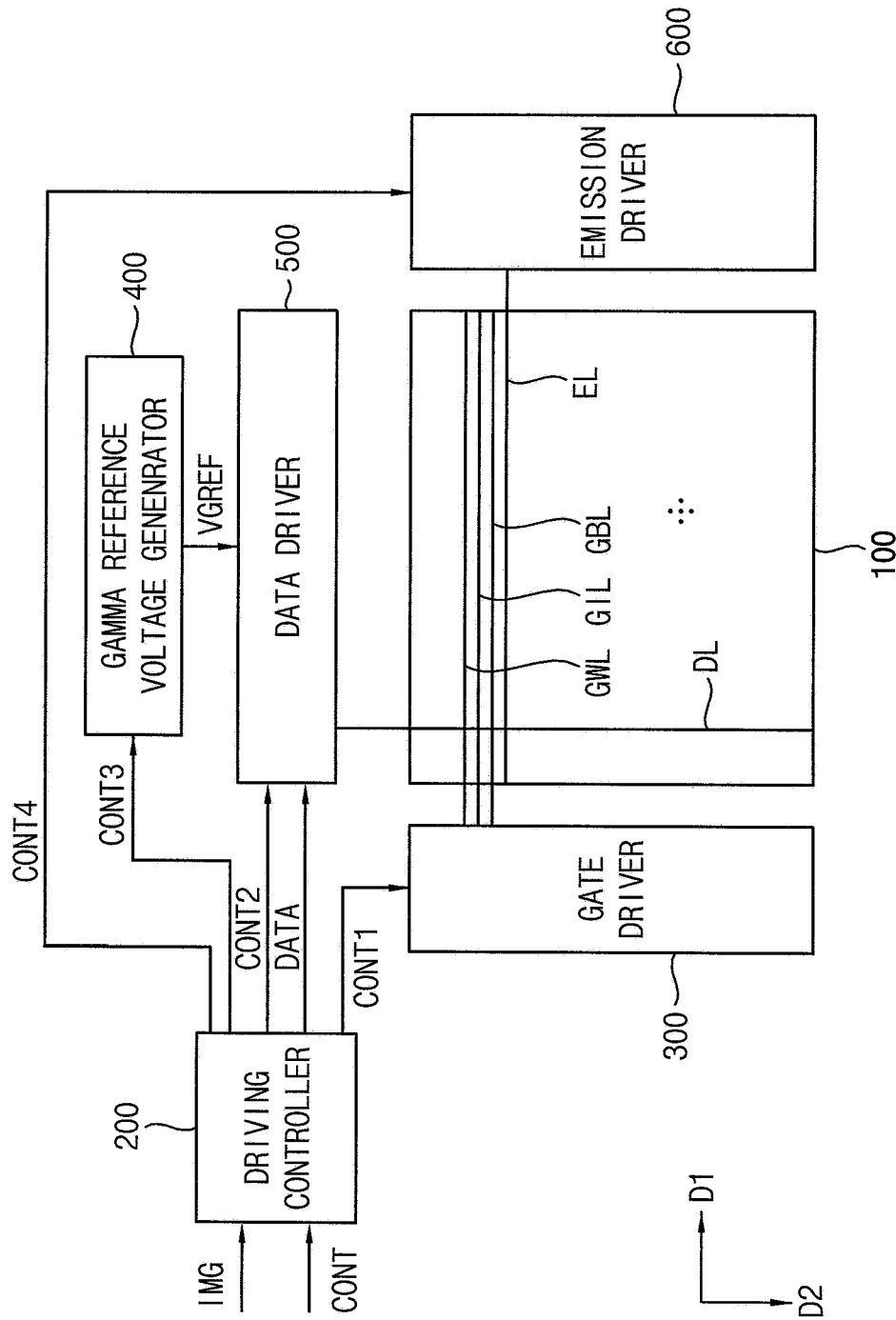
FIG. 1 is a block diagram illustrating a display apparatus according to an exemplary embodiment of the present inventive concept.

Hereinafter, example embodiments will be described in more detail with reference to the accompanying drawings, in which like reference numbers refer to like elements throughout. The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present inventive concept.

The terminology used herein is for the purpose of describing particular embodiments only and is not intended to be limiting of the present inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present inventive concept refers to "one or more embodiments of the present inventive concept." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present inventive concept described herein (e.g., a display apparatus that includes a display panel and a display panel driver that further includes a driving controller, a gate driver, a gamma reference voltage generator, a data driver, and an emission driver) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Exemplary embodiments of the present inventive concept relate to a display apparatus adjusting an applying timing of a gate signal (e.g., the timing of application of the gate signal) according to an input image, and a method of driving a display panel using the display apparatus.

FIG. 1 is a block diagram illustrating a display apparatus according to an exemplary embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500, and an emission driver 600.

The display panel 100 has a display region on which an image is displayed and a peripheral region adjacent to the display region.

The display panel 100 includes a plurality of gate lines GWL, GIL, and GBL, a plurality of data lines DL, a plurality of emission lines EL, and a plurality of pixels electrically connected to the gate lines GWL, GIL, and GBL, the data lines DL, and the emission lines EL. The gate lines GWL, GIL, and GBL may extend in a first direction D1, the data lines DL may extend in a second direction D2 crossing the first direction D1 and the emission lines EL may extend in the first direction D1.

The driving controller 200 receives input image data IMG and an input control signal CONT from an external apparatus (not shown). For example, the input image data IMG may include red image data, green image data, and blue image data. In some examples, the input image data IMG may include white image data. In some examples, the input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, and GBL in response to the first control signal CONT1 received from the driving controller 200. The gate driver 300 may sequentially output the gate signals to the gate lines GWL, GIL, and GBL.

The gamma reference voltage generator 400 generates a gamma reference voltage VGREF in response to the third control signal CONT3 received from the driving controller 200. The gamma reference voltage generator 400 provides the gamma reference voltage VG REF to the data driver 500. The gamma reference voltage VGREF has a value corresponding to a level of the data signal DATA.

In an exemplary embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

For example, the data driver 500 and the driving controller 200 may be integrally formed to form a timing controller embedded data driver (TED).

The emission driver 600 generates emission signals to drive the emission lines EL in response to the fourth control signal CONT4 received from the driving controller 200. The emission driver 600 may output the emission signals to the emission lines EL.

Figure 2:
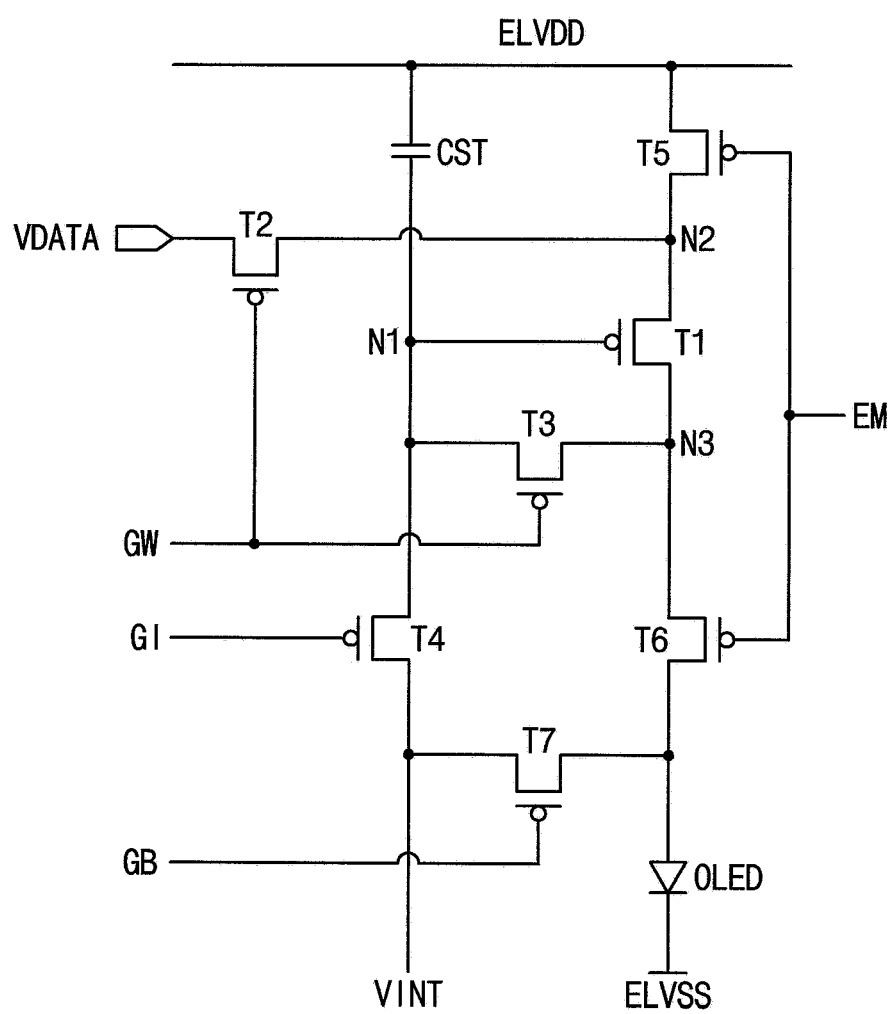
FIG. 2 is a circuit diagram illustrating a pixel of a display panel of FIG. 1.
Figure 3:
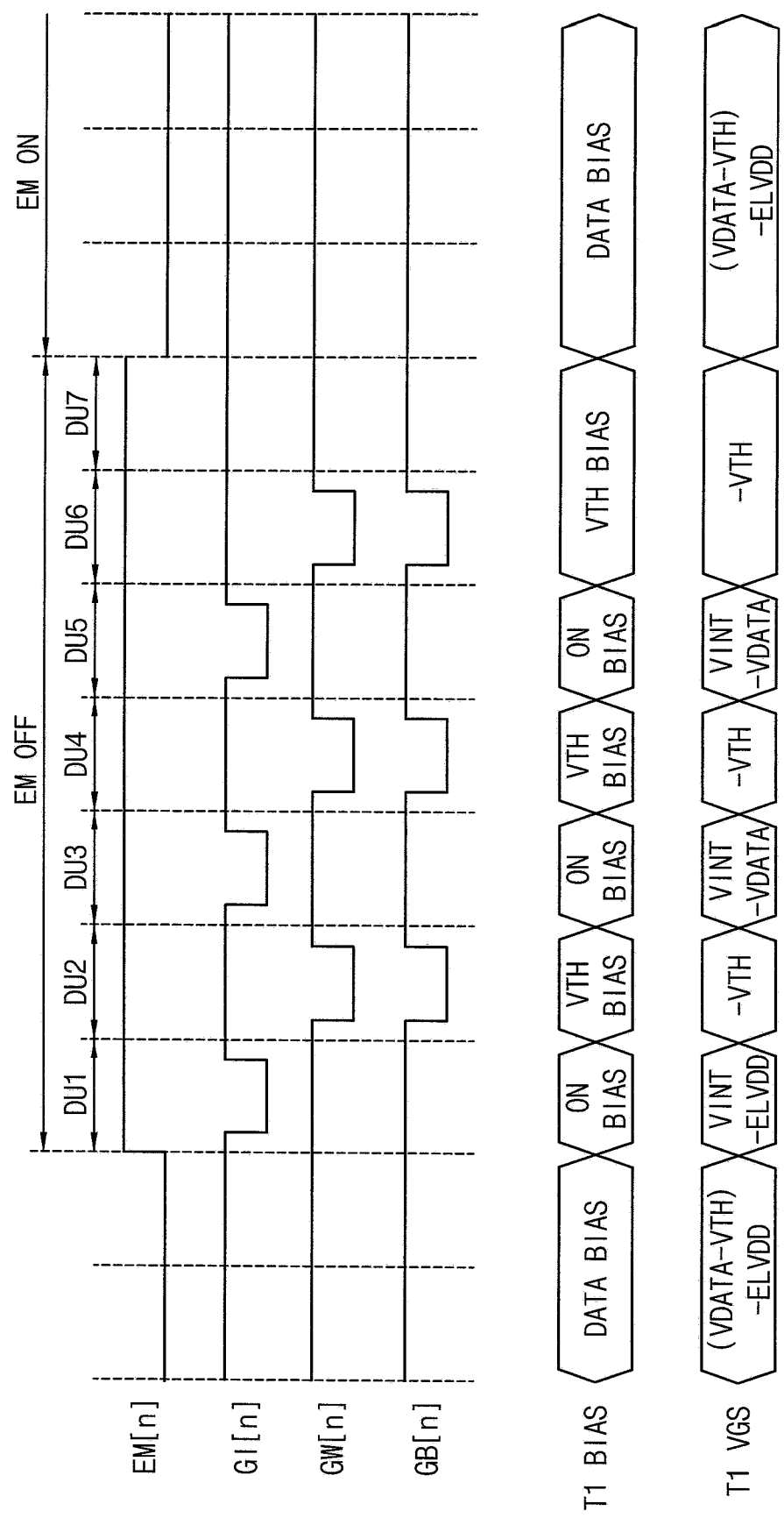
FIG. 3 is a timing diagram illustrating input signals applied to the pixel of FIG. 2.

FIG. 2 is a circuit diagram illustrating a pixel of the display panel 100 of FIG. 1. FIG. 3 is a timing diagram illustrating input signals applied to the pixel of FIG. 2.

Referring to FIGS. 1-3, the display panel 100 includes the plurality of the pixels. Each pixel includes an organic light emitting element OLED.

The pixel receives a data write gate signal GW, a data initialization gate signal GI, an organic light emitting element initialization signal GB, the data voltage VDATA, and the emission signal EM, and the organic light emitting element OLED of the pixel emits light corresponding to the level of the data voltage VDATA to display the image.

At least one of the pixels may include first to seventh pixel switching elements T1 to T7, a storage capacitor CST, and the organic light emitting element OLED.

The first pixel switching element T1 includes a control electrode connected to a first node N1, an input electrode connected to a second node N2, and an output electrode connected to a third node N3.

For example, the first pixel switching element T1 may be a P-type thin film transistor. The control electrode of the first pixel switching element T1 may be a gate electrode, the input electrode of the first pixel switching element T1 may be a source electrode, and the output electrode of the first pixel switching element T1 may be a drain electrode.

The second pixel switching element T2 includes a control electrode to which the data write gate signal GW is applied, an input electrode to which the data voltage VDATA is applied, and an output electrode connected to the second node N2.

For example, the second pixel switching element T2 may be a P-type thin film transistor. The control electrode of the second pixel switching element T2 may be a gate electrode, the input electrode of the second pixel switching element T2 may be a source electrode, and the output electrode of the second pixel switching element T2 may be a drain electrode.

The third pixel switching element T3 includes a control electrode to which the data write gate signal GW is applied, an input electrode connected to the first node N1, and an output electrode connected to the third node N3.

For example, the third pixel switching element T3 may be a P-type thin film transistor. The control electrode of the third pixel switching element T3 may be a gate electrode, the input electrode of the third pixel switching element T3 may be a source electrode, and the output electrode of the third pixel switching element T3 may be a drain electrode.

The fourth pixel switching element T4 includes a control electrode to which the data initialization gate signal GI is applied, an input electrode to which an initialization voltage VINT is applied, and an output electrode connected to the first node N1.

For example, the fourth pixel switching element T4 may be a P-type thin film transistor. The control electrode of the fourth pixel switching element T4 may be a gate electrode, the input electrode of the fourth pixel switching element T4 may be a source electrode, and the output electrode of the fourth pixel switching element T4 may be a drain electrode.

The fifth pixel switching element T5 includes a control electrode to which the emission signal EM is applied, an input electrode to which a high power voltage ELVDD is applied, and an output electrode connected to the second node N2.

For example, the fifth pixel switching element T5 may be a P-type thin film transistor. The control electrode of the fifth pixel switching element T5 may be a gate electrode, the input electrode of the fifth pixel switching element T5 may be a source electrode, and the output electrode of the fifth pixel switching element T5 may be a drain electrode.

The sixth pixel switching element T6 includes a control electrode to which the emission signal EM is applied, an input electrode connected to the third node N3, and an output electrode connected to an anode electrode of the organic light emitting element OLED.

For example, the sixth pixel switching element T6 may be a P-type thin film transistor. The control electrode of the sixth pixel switching element T6 may be a gate electrode, the input electrode of the sixth pixel switching element T6 may be a source electrode, and the output electrode of the sixth pixel switching element T6 may be a drain electrode.

The seventh pixel switching element T7 includes a control electrode to which the organic light emitting element initialization gate signal GB is applied, an input electrode to which the initialization voltage VINT is applied, and an output electrode connected to the anode electrode of the organic light emitting element OLED.

For example, the seventh pixel switching element T7 may be a P-type thin film transistor. The control electrode of the seventh pixel switching element T7 may be a gate electrode, the input electrode of the seventh pixel switching element T7 may be a source electrode, and the output electrode of the seventh pixel switching element T7 may be a drain electrode.

The storage capacitor CST includes a first electrode to which the high power voltage ELVDD is applied, and a second electrode connected to the first node N1.

The organic light emitting element OLED includes the anode electrode connected to the output electrode of the sixth switching element T6, and a cathode electrode to which a low power voltage ELVSS is applied.

In FIG. 3, a bias of the first pixel switching element T1 in an emission duration prior to a first duration DU1 may be referred to DATA BIAS. During the emission duration prior to the first duration DU1, a gate-source voltage VGS of the first pixel switching element has a level of (VDATA-VTH)-ELVDD.

During the first duration DU1 to a seventh duration DU7, the emission signal EM[n] may have an inactive period EM OFF. During the inactive period EM OFF of the emission signal EM[n], the pixel may be initialized and a new data voltage VDATA may be written to the pixel.

During the first duration DU1, the first node N1 and the storage capacitor CST are initialized in response to the data initialization gate signal GI. During the first duration DU1, the initialization voltage VINT is applied to the first node N1. During the first duration DU1, the bias of the first pixel switching element T1 may be referred to as ON BIAS. During the first duration DU1, the gate-source voltage VGS of the first pixel switching element T1 may have a level of VINT-ELVDD. During the first duration DU1, a gate voltage of the first pixel switching element T1 may be the initialization voltage VINT and a source voltage of the first pixel switching element T1 may be the high power voltage ELVDD.

During a second duration DU2, a threshold voltage |VTH| of the first pixel switching element T1 is compensated and the data voltage VDATA of which the threshold voltage |VTH| is compensated is written to the first node N1 in response to the data write gate signals GW. During the second duration DU2, the bias of the first pixel switching element T1 may be referred to as threshold voltage bias VTH BIAS. During the second duration DU2, the gate-source voltage VGS of the first pixel switching element T1 may have a level of −VTH. During the second duration DU2, a gate voltage of the first pixel switching element T1 may be VDATA-VTH and a source voltage of the first pixel switching element T1 may be VDATA.

During the second duration DU2, the anode electrode of the organic light emitting element OLED may be initialized in response to the organic light emitting element initialization signal GB.

In the present exemplary embodiment, the data write gate signal GW may be outputted to the pixel of the display panel after the data initialization gate signal GI is outputted to the pixel.

In the present exemplary embodiment, the data write gate signal GW and the organic light emitting element initialization signal GB may be concurrently (e.g., simultaneously) outputted to the pixel of the display panel. Alternatively, the organic light emitting element initialization signal GB may be outputted to the pixel of the display panel after the data write gate signal GW is outputted to the pixel.

During a third duration DU3, the first node N1 and the storage capacitor CST are initialized in response to the data initialization gate signal GI. During the third duration DU3, the initialization voltage VINT is applied to the first node N1. During the third duration DU3, the bias of the first pixel switching element T1 may be referred to as ON BIAS. During the third duration DU3, the gate-source voltage VGS of the first pixel switching element T1 may have a level of VINT-VDATA. During the third duration DU3, a gate voltage of the first pixel switching element T1 may be the initialization voltage VINT, and a source voltage of the first pixel switching element T1 may be the data voltage VDATA.

An operation of the pixel during a fourth duration DU4 may be the same as or substantially similar to the operation of the pixel during the second duration DU2.

During the fourth duration DU4, the threshold voltage |VTH| of the first pixel switching element T1 is compensated and the data voltage VDATA of which the threshold voltage |VTH| is compensated is written to the first node N1 in response to the data write gate signals GW. During the fourth duration DU4, the bias of the first pixel switching element T1 may be referred to as threshold voltage bias VTH BIAS.

During the fourth duration DU4, the anode electrode of the organic light emitting element OLED may be initialized in response to the organic light emitting element initialization signal GB.

An operation of the pixel during a fifth duration DU5 may be the same as the operation of the pixel during the third duration DU3. During the fifth duration DU5, the bias of the first pixel switching element T1 may be referred to as ON BIAS.

In addition, an operation of the pixel during a sixth duration DU6 may be the same as the operation of the pixel during the fourth duration DU4. During the sixth duration DU6, the bias of the first pixel switching element T1 may be referred to as threshold voltage bias VTH BIAS.

In the present exemplary embodiment, a plurality of pulses of the data write gate signal GW, a plurality of pulses of the data initialization gate signal GI, and a plurality of pulses of the organic light emitting element initialization gate signal GB may be outputted to the pixel in the single inactive period EM OFF of the emission signal EM. For example, three pulses of the data write gate signal GW, three pulses of the data initialization gate signal GI, and three pulses of the organic light emitting element initialization gate signal GB may be outputted to the pixel in the single inactive period EM OFF of the emission signal EM.

During a seventh duration DU7, the data initialization gate signal GI, the data write gate signal GW, and the organic light emitting element initialization gate signal GB may not be activated. Thus, during the seventh duration DU7, the threshold voltage bias VTH BIAS of the first pixel switching element T1 may be maintained.

After the seventh duration DU7, the emission signal EM[n] is activated. During the emission duration EM ON after the seventh duration DU7, the organic light emitting element OLED emits light in response to the emission signal EM so that the display panel 100 displays an image. During the emission duration EM ON after the seventh duration DU7, the bias of the first pixel switching element T1 may be referred to as DATA BIAS. During the emission duration EM ON after the seventh duration DU7, the gate-source voltage of the first pixel switching element T1 may have a level of (VDATA−VTH)−ELVDD.

In the first duration DU1, the data initialization gate signal GI may have an active level. For example, the active level of the data initialization gate signal GI may be a low level. When the data initialization gate signal GI has the active level, the fourth pixel switching element T4 is turned on so that the initialization voltage VINT may be applied to the first node N1. For example, the data initialization gate signal GI[n] of a present stage may be generated based on a scan signal of a previous stage.

In the second duration DU2, the data write gate signal GW may have an active level. For example, the active level of the data write gate signal GW may be a low level. When the data write gate signal GW has the active level, the second pixel switching element T2 and the third pixel switching element T3 are turned on. In addition, the first pixel switching element T1 is turned on in response to the initialization voltage VINT. The first data write gate signal GW[n] of the present stage may be generated based on a scan signal of the present stage.

A voltage generated by subtracting an absolute value |VTH| of the threshold voltage of the first pixel switching element T1 from the data voltage VDATA may be charged at the first node N1 along a path generated by the first to third pixel switching elements T1, T2, and T3.

In addition, in the second duration DU2, the organic light emitting element initialization signal GB may have an active level. For example, the active level of the organic light emitting element initialization signal GB may be a low level. When the organic light emitting element initialization signal GB has the active level, the seventh pixel switching element T7 is turned on so that the initialization voltage VINT may be applied to the anode electrode of the organic light emitting element OLED. In the present exemplary embodiment, the organic light emitting element initialization signal GB[n] of the present stage may be generated based on the scan signal of the present stage. Alternatively, the organic light emitting element initialization signal GB[n] of the present stage may be generated based on a scan signal of a next stage.

The operation of the pixel in the third duration DU3 and in the fifth duration DU5 may be substantially the same as the operation of the pixel in the first duration DU1.

The operation of the pixel in the fourth duration DU4 and in the sixth duration DU6 may be substantially the same as the operation of the pixel in the second duration DU2.

In the emission duration EM ON after the seventh duration DU7, the emission signal EM[n] may have an active level. The active level of the emission signal EM[n] may be a low level. When the emission signal EM[n] has the active level, the fifth pixel switching element T5 and the sixth pixel switching element T6 are turned on. In addition, the first pixel switching element T1 is turned on by the data voltage VDATA.

A driving current flows through the fifth pixel switching element T5, the first pixel switching element T1 and the sixth pixel switching element T6 to drive the organic light emitting element OLED. An intensity of the driving current may be determined by the level of the data voltage VDATA. A luminance of the organic light emitting element OLED is determined by the intensity of the driving current. The driving current ISD flowing through a path from the input electrode to the output electrode of the first pixel switching element T1 is determined as following Equation 1.

$$ISD = \frac{1}{2}\mu Cox \frac{W}{L}(VSG - |VTH|)^2 \qquad \text{Equation 1}$$

In Equation 1, μ is a mobility of the first pixel switching element T1. Cox is a capacitance per unit area of the first pixel switching element T1. W/L is a width to length ratio of the first pixel switching element T1. VSG is a voltage between the input electrode N2 of the first pixel switching element T1 and the control node N1 of the first pixel switching element T1. |VTH| is the absolute value of the threshold voltage of the first pixel switching element T1.

The voltage VG of the first node N1 after the compensation of the threshold voltage |VTH| during the second duration DU2 may be represented as following Equation 2.

$$VG = VDATA - |VTH| \qquad \text{Equation 2}$$

When the organic light emitting element OLED emits the light during the emission duration EM ON after the seventh duration DU7, the driving voltage VOV and the driving current ISD may be represented as following Equations 3 and 4. In Equation 3, VS is a voltage of the second node N2.

$$VOV = VS - VG - |VTH| = \\ ELVDD - (VDATA - |VTH|) - |VTH| = ELVDD - VDATA \qquad \text{Equation 3}$$

$$ISD = \frac{1}{2}\mu Cox \frac{W}{L}(ELVDD - VDATA)^2 \qquad \text{Equation 4}$$

The threshold voltage |VTH| is compensated during the second duration DU2, so that the driving current ISD may be determined regardless of the threshold voltage |VTH| of the first pixel switching element T1 when the organic light emitting element OLED emits the light during the emission duration EM ON after the seventh duration DU7.

Figure 4:
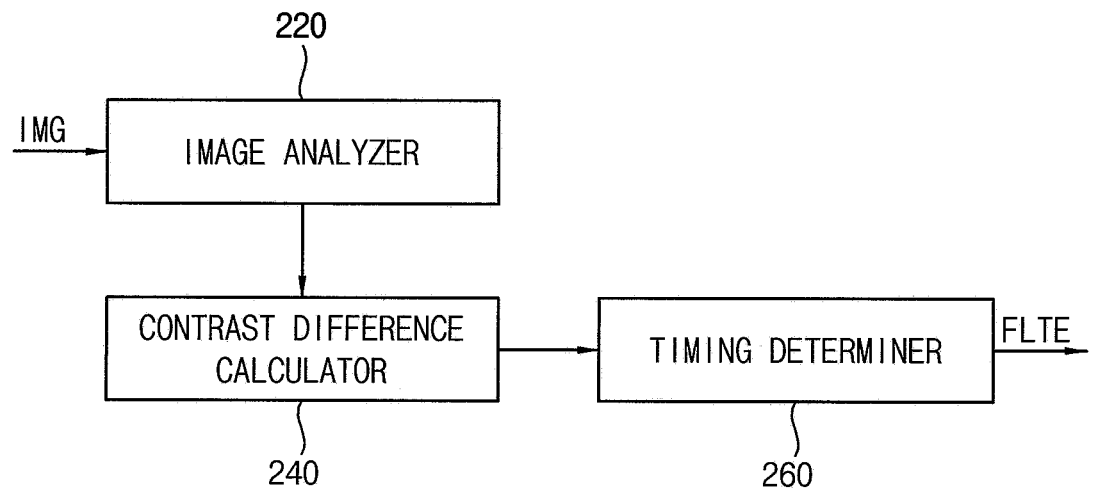
FIG. 4 is a block diagram illustrating a driving controller of FIG. 1.
Figure 5:
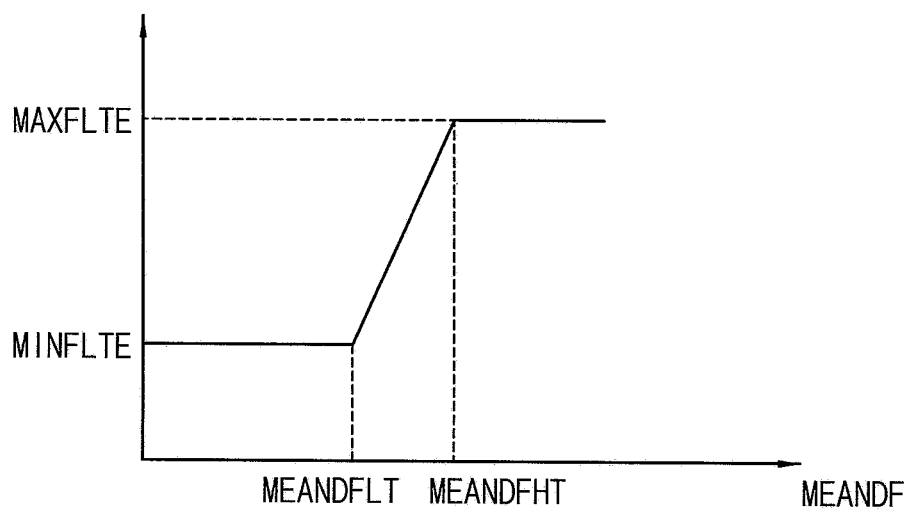
FIG. 5 is a graph illustrating an operation of a timing determiner of FIG. 4.

FIG. 4 is a block diagram illustrating the driving controller 200 of FIG. 1. FIG. 5 is a graph illustrating an operation of a timing determiner 260 of FIG. 4.

Referring to FIGS. 1-5, the gate driver 300 outputs the gate signal having different applying timings for frames according to a difference between a grayscale value of a present frame image and a grayscale value of a previous frame image to the display panel 100.

Herein, the gate signal may include the data write gate signal GW, the data initialization gate signal GI, and the organic light emitting element initialization gate signal GB.

The driving controller 200 adjusts the driving timing of the gate driver 300.

The driving controller 200 includes an image analyzer 220 for analyzing the input image data IMG, a contrast difference calculator 240 for calculating a difference MEANDF between the grayscale value of the present frame image and the grayscale value of the previous frame image and a timing determiner 260 for generating a gate timing control signal FLTE for determining an applying timing of the gate signal according to the difference MEANDF between the grayscale value of the present frame image and the grayscale value of the previous frame image.

In an exemplary embodiment, the grayscale value of the present frame image may correspond to an entire area of the display panel 100. The grayscale value of the present frame image may be an average of grayscale values corresponding to the entire area of the display panel 100. The grayscale value of the previous frame image may correspond to the entire area of the display panel 100. The grayscale value of the previous frame image may be an average of grayscale values corresponding to the entire area of the display panel 100.

In an exemplary embodiment, the grayscale value of the present frame image may correspond to a central portion of the display panel 100. For example, the grayscale value of the present frame image may be an average of grayscale values corresponding to the central portion of the display panel 100. The grayscale value of the previous frame image may also correspond to the central portion of the display panel 100, and the grayscale value of the previous frame image may be an average of grayscale values corresponding to the central portion of the display panel 100. A display defect due to a turned off pixel or an after image may be perceived by a user in the central portion of the display panel 100. Thus, the contrast difference calculator may be configured to calculate the difference MEANDF between the grayscale value of the present frame image (e.g., the average grayscale value of the present frame image) and the grayscale value of the previous frame image (e.g., the average grayscale value of the previous frame image) corresponding to the central portion of the display panel 100. When the contrast difference calculator calculates the difference MEANDF between the grayscale value of the present frame image and the grayscale value of the previous frame image corresponding to the central portion of the display panel 100, a storage area (e.g., a memory) to store the input image data IMG may be reduced compared to calculating the difference MEANDF between the grayscale value of the present frame image and the grayscale value of the previous frame image corresponding to the entire area of the display panel 100.

For example, the gate timing control signal FLTE may be defined as a time duration from an inactivation edge of the emission signal EM to an activation edge of the data initialization gate signal GI. For example, the gate timing control signal FLTE may be defined as a time duration from a rising edge of the emission signal EM to a falling edge of the data initialization gate signal GI.

When the difference MEANDF between the grayscale value of the present frame image and the grayscale value of the previous frame image is equal to or less than a first threshold value MEANDFLT, the timing determiner 260 may determine the gate timing control signal FLTE as a first value MIN FLTE. The first value MIN FLTE may be a minimum value of the gate timing control signal FLTE.

When the difference MEANDF between the grayscale value of the present frame image and the grayscale value of the previous frame image is greater than the first threshold value MEANDFLT and equal to or less than a second threshold value MEANDFHT, the timing determiner 260 may linearly determine the gate timing control signal FLTE between the first value MIN FLTE and a second value MAX FLTE greater than the first value MIN FLTE. The second value MAX FLTE may be a maximum value of the gate timing control signal FLTE. The second value MAX FLTE may be determined such that an active period of the gate signal does not exceed out of an inactive period of the emission signal EM.

When the difference MEANDF between the grayscale value of the present frame image and the grayscale value of the previous frame image is greater than the second threshold value MEANDFHT, the timing determiner 260 may determine the gate timing control signal FLTE as the second value MAX FLTE.

Figure 6:
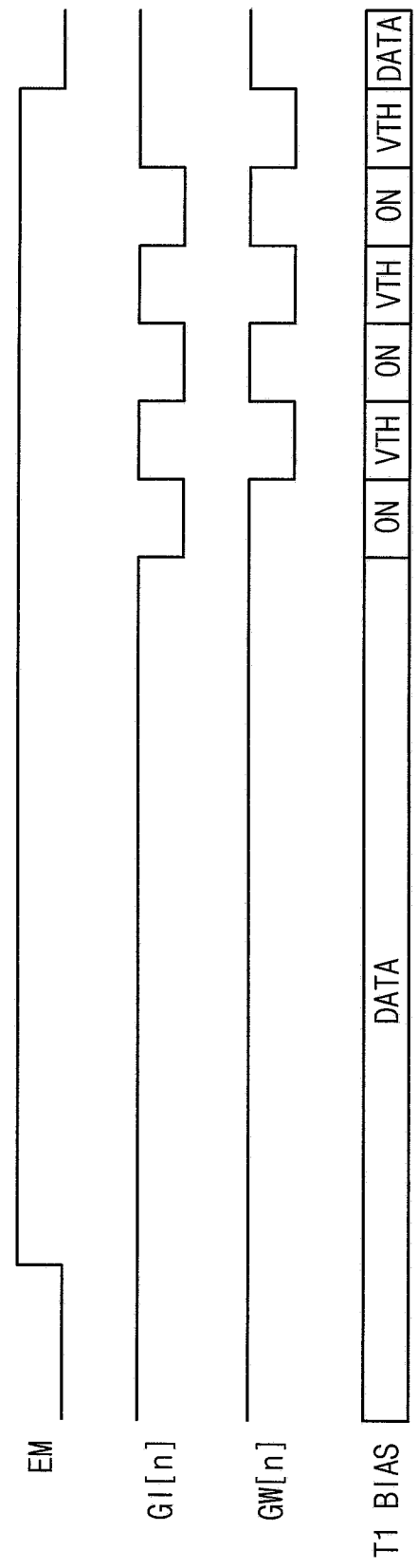
FIG. 6 is a timing diagram illustrating the input signals applied to the pixel of FIG. 2 when an applying timing of a gate signal is adjusted to be in a late region in an inactive period of an emission signal.
Figure 7:
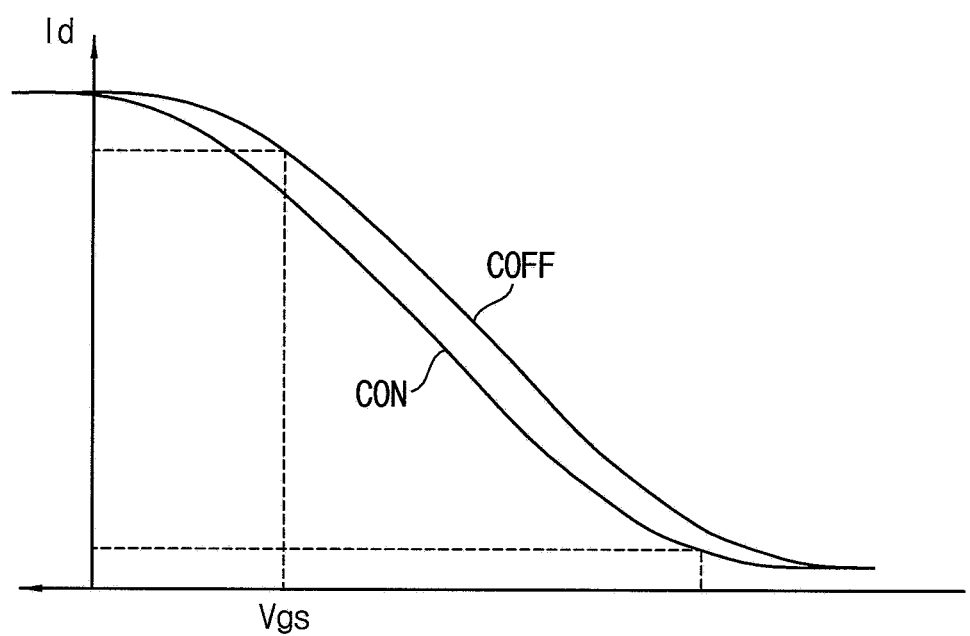
FIG. 7 is a graph illustrating a current-voltage curve of a switching element of the pixel of FIG. 2 when the applying timing of the gate signal is adjusted to be in the late region in the inactive period of the emission signal.
Figure 8:
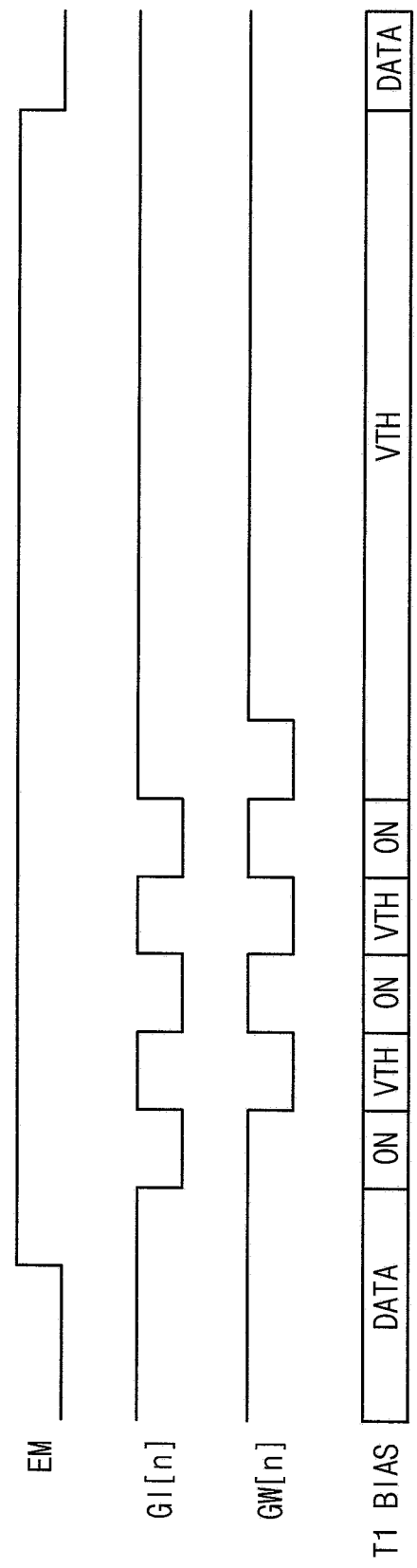
FIG. 8 is a timing diagram illustrating the input signals applied to the pixel of FIG. 2 when the applying timing of the gate signal is adjusted to be in an early region in the inactive period of the emission signal.
Figure 9:
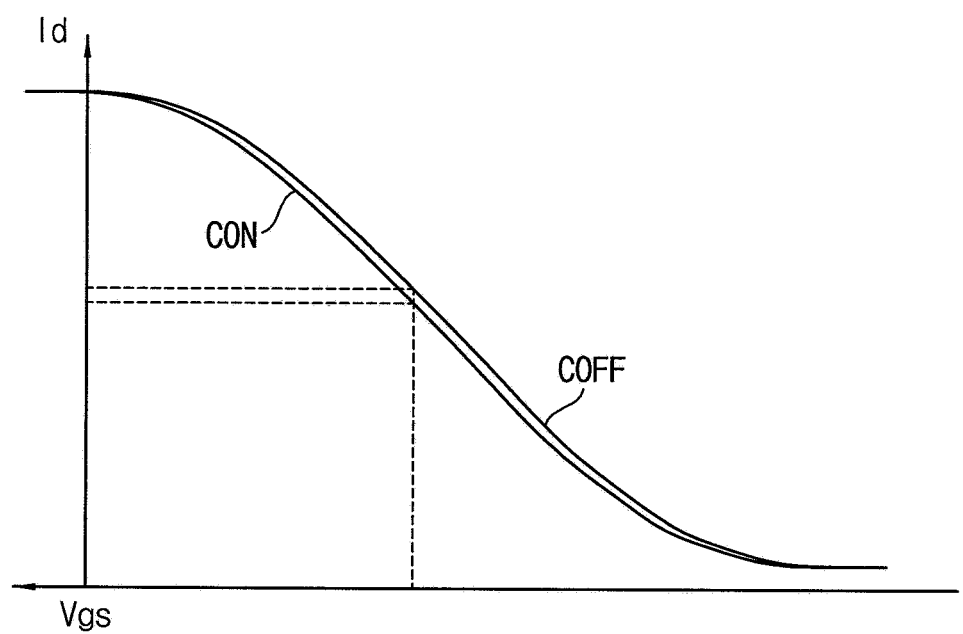
FIG. 9 is a graph illustrating a current-voltage curve of a switching element of the pixel of FIG. 2 when the applying timing of the gate signal is adjusted to be in the early region in the inactive period of the emission signal.

FIG. 6 is a timing diagram illustrating the input signals applied to the pixel of FIG. 2 when an applying timing of the gate signal is adjusted to be in a late region in the inactive period of the emission signal. FIG. 7 is a graph illustrating a current-voltage curve of a switching element of the pixel of FIG. 2 when the applying timing of the gate signal is adjusted to be in the late region in the inactive period of the emission signal. FIG. 8 is a timing diagram illustrating the input signals applied to the pixel of FIG. 2 when the applying timing of the gate signal is adjusted to be in an early region in the inactive period of the emission signal. FIG. 9 is a graph illustrating a current-voltage curve of a switching element of the pixel of FIG. 2 when the applying timing of the gate signal is adjusted to be in the early region in the inactive period of the emission signal.

Referring to FIGS. 1-9, the gate driver 300 outputs the gate signal having different applying timings for frames according to the difference MEANDF between the grayscale value of the present frame image and the grayscale value of the previous frame image to the display panel 100.

For example, when the difference MEANDF between the grayscale value of the present frame image and the grayscale value of the previous frame image is great (e.g., greater than a first grayscale value difference threshold), the applying timing of the gate signal GW, GI and GB may be late in the inactive period EM OFF of the emission signal EM.

A great difference MEANDF between the grayscale value of the present frame image and the grayscale value of the previous frame image may mean a great contrast change between the present frame image and the previous frame image.

As shown in FIG. 6, when the contrast change between the present frame image and the previous frame image is great, DATA BIAS status of the first pixel switching element T1 may be maintained for a relatively long time. If the DATA BIAS status of the first pixel switching element T1 is maintained for a long time, a degree of compensation of hysteresis of the first pixel switching element T1 may be small (e.g., smaller than a second grayscale value difference threshold).

In FIG. 7, when the previous frame image represents a high grayscale value image, a current-voltage curve of the first pixel switching element T1 may be a first curve CON and when the previous frame image represents a low grayscale value image, a current-voltage curve of the first pixel switching element T1 may be a second curve COFF. When the degree of the compensation of the hysteresis of the first pixel switching element T1 is great, the distance between the first curve CON and the second curve COFF may be small. The degree of the compensation of the hysteresis of the first pixel switching element T1 in FIG. 7 is less than the degree of the compensation of the hysteresis of the first pixel switching element T1 in FIG. 9. Thus, the distance between the first curve CON and the second curve COFF in FIG. 7 may be greater than the distance between the first curve CON and the second curve COFF in FIG. 9.

When the hysteresis of the switching element is compensated enough (e.g., sufficiently), some of the pixels may not be turned on in a low grayscale image so that a display defect may be generated by one or more of the turned off pixels. When the contrast change between the present frame image and the previous frame image is great, the display defect due to an after image may not be generated. Thus, when the contrast change between the present frame image and the previous frame image is great, the degree of the compensation of the hysteresis of the first pixel switching element T1 may be controlled to be small so that the display defect due to the turned off pixels in the low grayscale image may be reduced or prevented.

For example, when the difference MEANDF between the grayscale value of the present frame image and the grayscale value of the previous frame image is small, the applying timing of the gate signal GW, GI and GB may be early in the inactive period EM OFF of the emission signal EM.

The small difference MEANDF between the grayscale value of the present frame image and the grayscale value of the previous frame image may mean a little contrast change between the present frame image and the previous frame image.

As shown in FIG. 8, when the contrast change between the present frame image and the previous frame image is little, the threshold voltage bias VTH BIAS status of the first pixel switching element T1 may be maintained for a relatively long time. If the threshold voltage bias VTH BIAS status of the first pixel switching element T1 is maintained for a long time, a degree of compensation of hysteresis of the first pixel switching element T1 may be great.

In FIG. 9, when the previous frame image represents a high grayscale value image, a current-voltage curve of the first pixel switching element T1 may be a first curve CON and when the previous frame image represents a low grayscale value image, a current-voltage curve of the first pixel switching element T1 may be a second curve COFF. When the degree of the compensation of the hysteresis of the first pixel switching element T1 is great, the distance between the first curve CON and the second curve COFF may be small. The degree of the compensation of the hysteresis of the first pixel switching element T1 in FIG. 9 is greater than the degree of the compensation of the hysteresis of the first pixel switching element T1 in FIG. 7. Thus, the distance between the first curve CON and the second curve COFF in FIG. 9 may be less than the distance between the first curve CON and the second curve COFF in FIG. 7.

When the hysteresis of the switching element is not compensated enough, an after image may be generated due to a shift of the current-voltage curve. When the contrast change between the present frame image and the previous frame image is little, the display defect due to the after image may be generated. Thus, when the contrast change between the present frame image and the previous frame image is little, the degree of the compensation of the hysteresis of the first pixel switching element T1 may be controlled to be great so that the display defect due to the display defect due to the after image may be reduced or prevented.

In an exemplary embodiment, when the grayscale value of the present frame image is equal to or less than the grayscale value of the previous frame image, the gate driver 300 may output the gate signals with the same applying timings for frames regardless of the differences between the grayscale value of the present frame image and the grayscale value of the previous frame image. When the grayscale value of the present frame image is greater than the grayscale value of the previous frame image, the gate driver 300 may output the gate signals with different applying timings for frames according to the differences between the grayscale value of the present frame image and the grayscale value of the previous frame image.

When the display panel 100 displays a high grayscale image right after displaying a low grayscale image, the display defect due to the turned off pixels may be generated. Thus, the gate driver 300 may output the gate signals with different applying timings for frames when the grayscale value of the present frame image is greater than the grayscale value of the previous frame image so that the display defect due to the turned off pixels may be reduced or prevented.

In contrast, when the grayscale value of the present frame image is equal to or less than the grayscale value of the previous frame image, the hysteresis of the first pixel switching element T1 may be compensated so that the display defect due to the after image due to the shift of the current-voltage curve may be reduced or prevented.

According to the present exemplary embodiment, display defects due to the turned off switching elements and the display defects due to an after image caused by the hysteresis of the switching element may be effectively reduced or prevented. Thus, the display quality of the display panel 100 may be enhanced.

Figure 10:
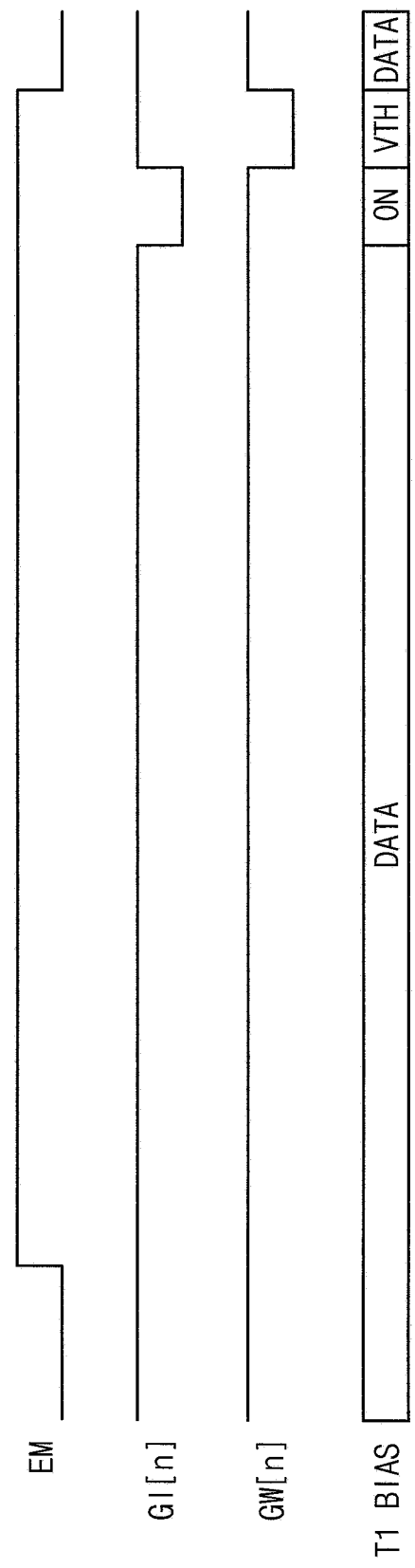
FIG. 10 is a timing diagram illustrating input signals applied to a pixel of a display apparatus according to an exemplary embodiment of the present inventive concept when an applying timing of a gate signal is adjusted to be in a late region in an inactive period of an emission signal.
Figure 11:
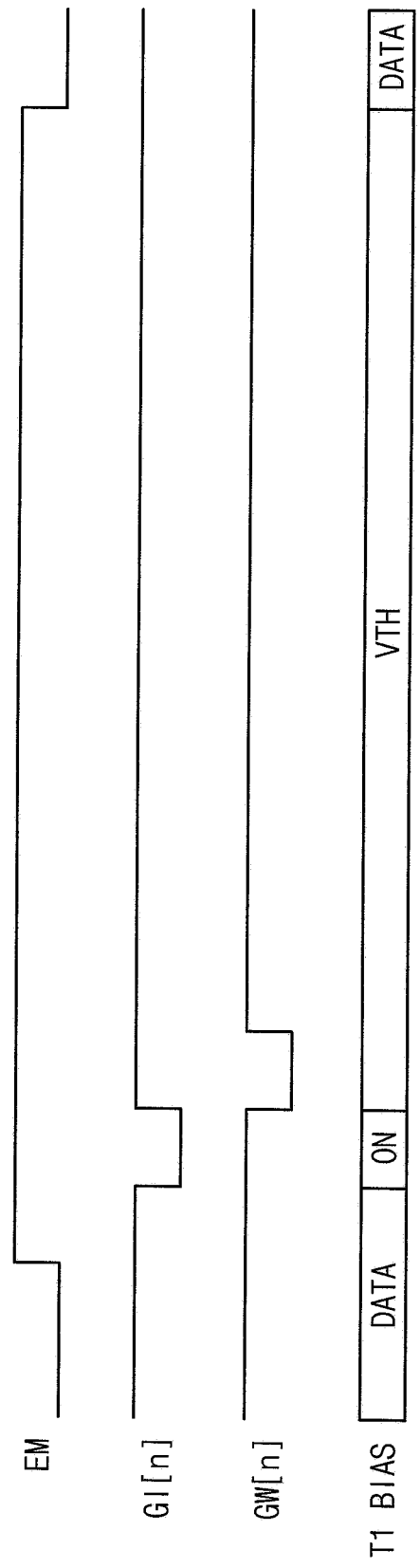
FIG. 11 is a timing diagram illustrating input signals applied to the pixel of the display apparatus of FIG. 10 when the applying timing of the gate signal is adjusted to be in an early region in the inactive period of the emission signal.

FIG. 10 is a timing diagram illustrating input signals applied to a pixel of a display apparatus according to an exemplary embodiment of the present inventive concept when an applying timing of a gate signal is adjusted to be in a late region in an inactive period of an emission signal. FIG. 11 is a timing diagram illustrating input signals applied to the pixel of the display apparatus of FIG. 10 when the applying timing of the gate signal is adjusted to be in an early region in the inactive period of the emission signal.

The display apparatus and the method of driving the display panel according to the present exemplary embodiment is substantially the same as the display apparatus and the method of driving the display panel of the previous exemplary embodiment explained referring to FIGS. 1-9 except for the gate signal applied to the pixel. Thus, the same reference numerals will be used to refer to the same or like parts as those described in the previous exemplary embodiment of FIGS. 1-9 and any repetitive explanation concerning the above elements may be omitted.

Referring to FIGS. 1-5, 10 and 11, the display apparatus includes a display panel 100 and a display panel driver. The display panel driver includes a driving controller 200, a gate driver 300, a gamma reference voltage generator 400, a data driver 500 and an emission driver 600.

The display panel 100 includes the plurality of the pixels. Each pixel includes an organic light emitting element OLED.

Each pixel is configured to receive a data write gate signal GW, a data initialization gate signal GI, an organic light emitting element initialization signal GB, the data voltage VDATA and the emission signal EM, and the organic light emitting element OLED of the pixel emits light corresponding to the level of the data voltage VDATA to display the image.

The gate driver 300 outputs the data write gate signal GW, the data initialization gate signal GI and the organic light emitting element initialization gate signal GB to the display panel 100 in the inactive period of the emission signal EM.

The first pixel switching element T1 may have a bias status that includes at least one of DATA BIAS status, ON BIAS status, and a threshold voltage bias VTH BIAS status according to the gate signals GW, GI and GB.

In the present exemplary embodiment, a single pulse of the data write gate signal GW, a single pulse of the data initialization gate signal GI and a single pulse of the organic light emitting element initialization gate signal GB may be outputted to the pixel in the single inactive period EM OFF of the emission signal EM. For example, applying the single pulse of the data write gate signal GW, the single pulse of the data initialization gate signal GI and the single pulse of the organic light emitting element initialization gate signal GB may be enough to operate data writing, data initialization and organic light emitting element initialization according to the characteristics of the display panel 100 and the characteristics of the gate driver 300.

The gate driver 300 outputs the gate signal having different applying timings for frames according to the difference MEANDF between the grayscale value of the present frame image and the grayscale value of the previous frame image to the display panel 100.

For example, when the difference MEANDF between the grayscale value of the present frame image and the grayscale value of the previous frame image is great (e.g., greater than a first grayscale difference threshold), the applying timing of the gate signal GW, GI and GB may be late in the inactive period EM OFF of the emission signal EM.

As shown in FIG. 10, when the contrast change between the present frame image and the previous frame image is great (e.g., greater than a first grayscale difference threshold), DATA BIAS status of the first pixel switching element T1 may be maintained for a relatively long time. If the DATA BIAS status of the first pixel switching element T1 is maintained for a long time, a degree of compensation of hysteresis of the first pixel switching element T1 may be small.

When the hysteresis of the switching element is compensated sufficiently, some of the pixels may not be turned on in a low grayscale image so that a display defect may be generated due to the turned off pixels. When the contrast change between the present frame image and the previous frame image is great, a display defect due to the after image may not be generated. Thus, when the contrast change between the present frame image and the previous frame image is great, the degree of the compensation of the hysteresis of the first pixel switching element T1 may be controlled to be little (e.g., small) so that the display defect due to the turned off pixels in the low grayscale value image may be reduced or prevented.

For example, when the difference MEANDF between the grayscale value of the present frame image and the grayscale value of the previous frame image is little, the applying timing of the gate signal GW, GI and GB may be early in the inactive period EM OFF of the emission signal EM.

As shown in FIG. 11, when the contrast change between the present frame image and the previous frame image is small (e.g., less than a second grayscale value difference threshold), the threshold voltage bias VTH BIAS status of the first pixel switching element T1 may be maintained for a relatively long time. If the threshold voltage bias VTH BIAS status of the first pixel switching element T1 is maintained for a long time, a degree of compensation of hysteresis of the first pixel switching element T1 may be great.

When the hysteresis of the switching element is not compensated enough, the after image may be generated due to a shift of the current-voltage curve. When the contrast change between the present frame image and the previous frame image is small, a display defect due to an after image may be generated. Thus, when the contrast change between the present frame image and the previous frame image is small, the degree of the compensation of the hysteresis of the first pixel switching element T1 may be controlled to be great so that a display defect due to the after image may be reduced or prevented.

According to the present exemplary embodiment, display defects due to turned off switching elements and the display defects due to after image due to the hysteresis of the switching element may be effectively reduced or prevented. Thus, the display quality of the display panel 100 may be enhanced.

Figure 12:
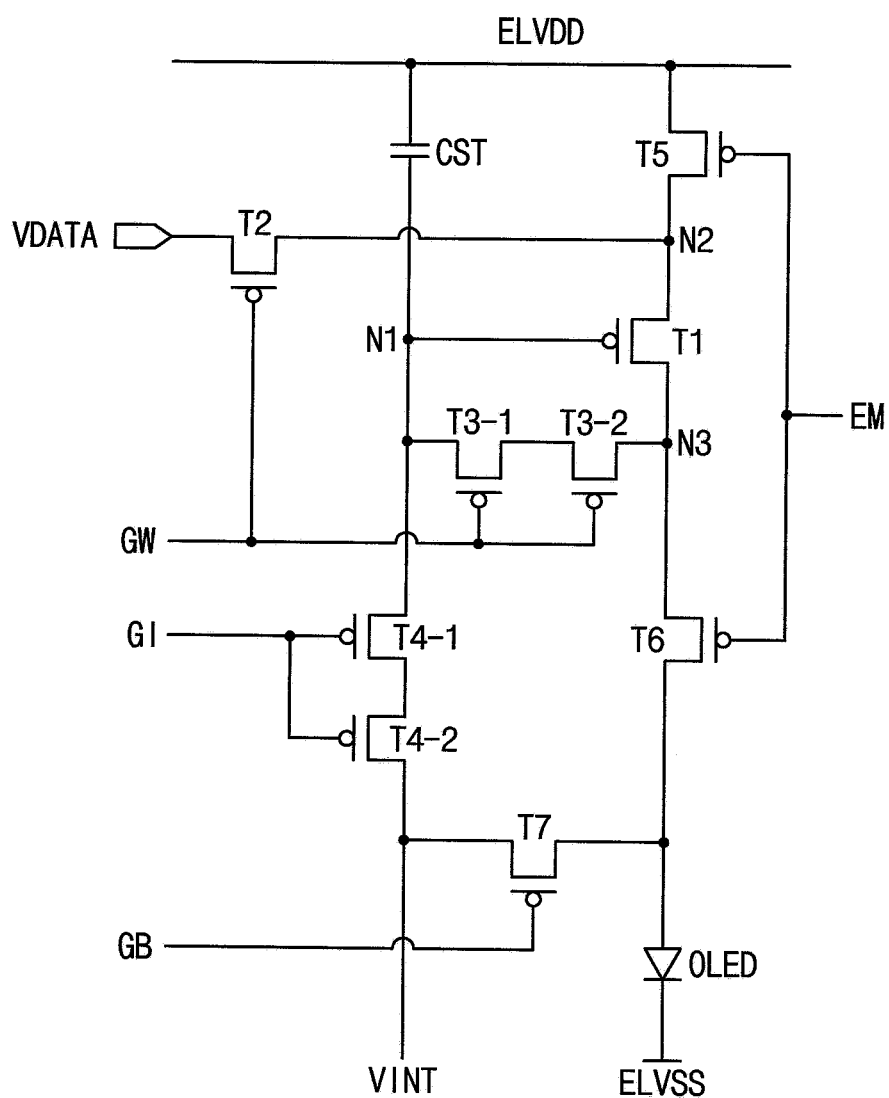
FIG. 12 is a circuit diagram illustrating a pixel of a display apparatus according to an exemplary embodiment of the present inventive concept.

FIG. 12 is a circuit diagram illustrating a pixel of a display apparatus according to an exemplary embodiment of the present inventive concept.

The display apparatus and the method of driving the display panel according to the present exemplary embodiment is substantially the same as the display apparatus and the method of driving the display panel of the previous exemplary embodiment explained referring to FIGS. 1-9 except for the structure of the pixel. Thus, the same reference numerals will be used to refer to the same or like parts as those described in the previous exemplary embodiment of FIGS. 1 to 9 and any repetitive explanation concerning the above elements may be omitted.

Referring to FIGS. 1, 3-9 and 12, the display apparatus includes a display panel 100 and a display panel driver. The display panel driver includes a driving controller 200, a gate driver 300, a gamma reference voltage generator 400, a data driver 500 and an emission driver 600.

The display panel 100 includes the plurality of the pixels. Each pixel includes an organic light emitting element OLED.

The pixel receives a data write gate signal GW, a data initialization gate signal GI, an organic light emitting element initialization signal GB, the data voltage VDATA and the emission signal EM, and the organic light emitting element OLED of the pixel emits light corresponding to the level of the data voltage VDATA to display the image.

At least one of the pixels may include first, second, first third (3-1), second third (3-2), first fourth (4-1), second fourth (4-2), fifth, sixth, and seventh pixel switching elements T1, T2, T3-1, T3-2, T4-1, T4-2, T5, T6, and T7, a storage capacitor CST and the organic light emitting element OLED.

The first pixel switching element T1 includes a control electrode connected to a first node N1, an input electrode connected to a second node N2, and an output electrode connected to a third node N3.

The second pixel switching element T2 includes a control electrode to which the data write gate signal GW is applied, an input electrode to which the data voltage VDATA is applied, and an output electrode connected to the second node N2.

The first third (3-1) pixel switching element T3-1 includes a control electrode to which the data write gate signal GW is applied, an input electrode connected to the first node N1, and an output electrode connected to an input electrode of the second third (3-2) pixel switching element T3-2.

The second third (3-2) pixel switching element T3-2 includes a control electrode to which the data write gate signal GW is applied, an input electrode connected to the output electrode of the first third (3-1) pixel switching element T3-1, and an output electrode connected to the third node N3.

The first fourth (4-1) pixel switching element T4-1 includes a control electrode to which the data initialization gate signal GI is applied, an input electrode connected to an output electrode of the second fourth (4-2) pixel switching element T4-2, and an output electrode connected to the first node.

The second fourth 4-2 pixel switching element T4-2 includes a control electrode to which the data initialization gate signal GI is applied, an input electrode to which an initialization voltage VINT is applied, and an output electrode connected to the input electrode of the first fourth 4-1 pixel switching element T4-1.

The fifth pixel switching element T5 includes a control electrode to which the emission signal EM is applied, an input electrode to which a high power voltage ELVDD is applied, and an output electrode connected to the second node N2.

The sixth pixel switching element T6 includes a control electrode to which the emission signal EM is applied, an input electrode connected to the third node N3, and an output electrode connected to an anode electrode of the organic light emitting element OLED.

The seventh pixel switching element T7 includes a control electrode to which the organic light emitting element initialization gate signal GB is applied, an input electrode to which the initialization voltage VINT is applied, and an output electrode connected to the anode electrode of the organic light emitting element OLED.

The storage capacitor CST includes a first electrode to which the high power voltage ELVDD is applied, and a second electrode connected to the first node N1.

The organic light emitting element OLED includes the anode electrode connected to the output electrode of the sixth switching element T6 and a cathode electrode to which a low power voltage ELVSS is applied.

The gate driver 300 outputs the gate signal having different applying timings for frames according to the difference MEANDF between the grayscale value of the present frame image and the grayscale value of the previous frame image to the display panel 100.

For example, when the difference MEANDF between the grayscale value of the present frame image and the grayscale value of the previous frame image is great, the applying timing of the gate signal GW, GI and GB may be late in the inactive period EM OFF of the emission signal EM.

According to the present exemplary embodiment, the display defects due to turned off switching elements and the display defects due to the after image caused by the hysteresis of the switching element may be effectively reduced or prevented. Thus, the display quality of the display panel 100 may be enhanced.

According to the present inventive concept as explained above, the applying timing of the gate signal is applied according to the input image so that the display quality of the organic light emitting display panel may be enhanced.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and aspects of the present inventive concept. Accordingly, all such modifications are intended to be included within the scope of the present inventive concept as defined in the claims and their equivalents. Therefore, it is to be understood that the foregoing is illustrative of the present inventive concept which is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A display apparatus comprising:
a display panel configured to display an image;
a gate driver configured to output a gate signal having different applying timings for frames according to a difference between a grayscale value of a present frame image and a grayscale value of a previous frame image to the display panel;
a data driver configured to output a data voltage to the display panel; and
an emission driver configured to output an emission signal to the display panel,
wherein the gate driver is configured to output the gate signal to the display panel a plurality of times at different time durations of an inactive period of the emission signal for the frames according to the difference between the grayscale value of the present frame image and the grayscale value of the previous frame image.

2. The display apparatus of claim 1, wherein as the difference between the grayscale value of the present frame image and the grayscale value of the previous frame image is greater, the applying timing of the gate signal is in a later time duration of the inactive period of the emission signal.

3. The display apparatus of claim 1, wherein when the grayscale value of the present frame image is equal to or less than the grayscale value of the previous frame image, the gate driver is configured to output the gate signal having the same applying timing for the frames regardless of the difference between the grayscale value of the present frame image and the grayscale value of the previous frame image, and
wherein when the grayscale value of the present frame image is greater than the grayscale value of the previous frame image, the gate driver is configured to output the gate signal in the different applying timings for the frames according to the difference between the grayscale value of the present frame image and the grayscale value of the previous frame image.

4. The display apparatus of claim 1, wherein the grayscale value of the present frame image corresponds to an entire area of the display panel, and
wherein the grayscale value of the previous frame image corresponds to the entire area of the display panel.

5. The display apparatus of claim 1, wherein the grayscale value of the present frame image corresponds to a central portion area of the display panel, and
wherein the grayscale value of the previous frame image corresponds to the central portion area of the display panel.

6. The display apparatus of claim 1, wherein the gate driver is configured to output a data write gate signal, a data initialization gate signal, and an organic light emitting element initialization gate signal to the display panel in the inactive period of the emission signal.

7. The display apparatus of claim 6, wherein the gate driver is configured to output the data write gate signal to a pixel of the display panel after the data initialization gate signal is outputted to the pixel of the display panel.

8. The display apparatus of claim 7, wherein the gate driver is configured to concurrently output the data write gate signal and the organic light emitting element initialization gate signal to the pixel of the display panel.

9. The display apparatus of claim 6, wherein the gate driver is configured to output a plurality of pulses of the data write gate signal, a plurality of pulses of the data initialization gate signal, and a plurality of pulses of the organic light emitting element initialization gate signal to a pixel of the display panel in a single inactive period of the emission signal.

10. The display apparatus of claim 6, wherein the gate driver is configured to output a single pulse of the data write gate signal, a single pulse of the data initialization gate signal, and a single pulse of the organic light emitting element initialization gate signal to a pixel of the display panel in a single inactive period of the emission signal.

11. The display apparatus of claim 1, further comprising a driving controller configured to adjust a driving timing of the gate driver,
wherein the driving controller comprises:
an image analyzer configured to analyze input image data;
a contrast difference calculator configured to determine the difference between the grayscale value of the present frame image and the grayscale value of the previous frame image; and
a timing determiner configured to generate a gate timing control signal for determining the applying timing of the gate signal according to the difference between the grayscale value of the present frame image and the grayscale value of the previous frame image.

12. A display apparatus comprising:
a display panel configured to display an image;
a gate driver configured to output a gate signal having different applying timings for frames according to a difference between a grayscale value of a present frame image and a grayscale value of a previous frame image to the display panel;
a data driver configured to output a data voltage to the display panel;
an emission driver configured to output an emission signal to the display panel; and
a driving controller configured to adjust a driving timing of the gate driver,
wherein the driving controller comprises:
an image analyzer configured to analyze input image data;
a contrast difference calculator configured to determine the difference between the grayscale value of the present frame image and the grayscale value of the previous frame image; and
a timing determiner configured to generate a gate timing control signal for determining the applying timing of the gate signal according to the difference between the grayscale value of the present frame image and the grayscale value of the previous frame image, wherein the timing determiner is configured to determine the gate timing control signal as a first value, when the difference between the grayscale value of the present frame image and the grayscale value of the previous frame image is equal to or less than a first threshold value, wherein the timing determiner is configured to linearly determine the gate timing control signal between the first value and a second value greater than the first value when the difference between the grayscale value of the present frame image and the grayscale value of the previous frame image is greater than the first threshold value and equal to or less than a second threshold value, and wherein the timing determiner is configured to determine the gate timing control signal as the second value when the difference between the grayscale value of the present frame image and the grayscale value of the previous frame image is greater than the second threshold value.

13. The display apparatus of claim 1, wherein the display panel comprises a plurality of pixels, wherein at least one of the pixels comprises an organic light emitting element, and wherein at least one of the pixels is configured to receive a data write gate signal, a data initialization gate signal, an organic light emitting element initialization gate signal, the data voltage, and the emission signal to emit the organic light emitting element to display the image.

14. The display apparatus of claim 13, wherein at least one of the pixels comprises:

a first pixel switching element comprising a control electrode connected to a first node, an input electrode connected to a second node, and an output electrode connected to a third node;

a second pixel switching element comprising a control electrode to which the data write gate signal is applied, an input electrode to which the data voltage is applied, and an output electrode connected to the second node;

a third pixel switching element comprising a control electrode to which the data write gate signal is applied, an input electrode connected to the first node, and an output electrode connected to the third node;

a fourth pixel switching element comprising a control electrode to which the data initialization gate signal is applied, an input electrode to which an initialization voltage is applied, and an output electrode connected to the first node;

a fifth pixel switching element comprising a control electrode to which the emission signal is applied, an input electrode to which a first power voltage is applied, and an output electrode connected to the second node;

a sixth pixel switching element comprising a control electrode to which the emission signal is applied, an input electrode connected to the third node, and an output electrode connected to an anode electrode of the organic light emitting element;

a seventh pixel switching element comprising a control electrode to which the organic light emitting element initialization gate signal is applied, an input electrode to which the initialization voltage is applied, and an output electrode connected to the anode electrode of the organic light emitting element;

a storage capacitor comprising a first electrode to which the first power voltage is applied, and a second electrode connected to the first node; and the organic light emitting element comprising the anode electrode, and a cathode electrode to which a second power voltage is applied.

15. The display apparatus of claim 13, wherein at least one of the pixels comprises:

a first pixel switching element comprising a control electrode connected to a first node, an input electrode connected to a second node, and an output electrode connected to a third node;

a second pixel switching element comprising a control electrode to which the data write gate signal is applied, an input electrode to which the data voltage is applied, and an output electrode connected to the second node;

a first third pixel switching element comprising a control electrode to which the data write gate signal is applied, an input electrode connected to the first node, and an output electrode connected to an input electrode of a second third pixel switching element;

the second third pixel switching element comprising a control electrode to which the data write gate signal is applied, the input electrode connected to the output electrode of the first third pixel switching element, and an output electrode connected to the third node;

a first fourth pixel switching element comprising a control electrode to which the data initialization gate signal is applied, an input electrode connected to an output electrode of a second fourth pixel switching element, and an output electrode connected to the first node;

the second fourth pixel switching element comprising a control electrode to which the data initialization gate signal is applied, an input electrode to which an initialization voltage is applied, and the output electrode connected to the input electrode of the first fourth pixel switching element;

a fifth pixel switching element comprising a control electrode to which the emission signal is applied, an input electrode to which a first power voltage is applied, and an output electrode connected to the second node;

a sixth pixel switching element comprising a control electrode to which the emission signal is applied, an input electrode connected to the third node, and an output electrode connected to an anode electrode of the organic light emitting element;

a seventh pixel switching element comprising a control electrode to which the organic light emitting element initialization gate signal is applied, an input electrode to which the initialization voltage is applied, and an output electrode connected to the anode electrode of the organic light emitting element;

a storage capacitor comprising a first electrode to which the first power voltage is applied, and a second electrode connected to the first node; and the organic light emitting element comprising the anode electrode, and a cathode electrode to which a second power voltage is applied.

16. A method of driving a display panel, the method comprising:

outputting a gate signal having different applying timings for frames to the display panel, wherein the gate signal is output according to a difference between a grayscale value of a present frame image and a grayscale value of a previous frame image;

outputting a data voltage to the display panel; and outputting an emission signal to the display panel, wherein the gate signal is output to the display panel a plurality of times at different time durations of an inactive period of the emission signal for the frames according to the difference between the grayscale value of the present frame image and the grayscale value of the previous frame image.

17. The method of claim 16, wherein as the difference between the grayscale value of the present frame image and the grayscale value of the previous frame image is greater, the applying timing of the gate signal is in a later time duration of the inactive period of the emission signal.

18. The method of claim 16, wherein when the grayscale value of the present frame image is equal to or less than the grayscale value of the previous frame image, the gate signal having the same applying timing for the frames is outputted to the display panel regardless of the difference between the grayscale value of the present frame image and the grayscale value of the previous frame image, and wherein when the grayscale value of the present frame image is greater than the grayscale value of the previous frame image, the gate signal is outputted to the display panel in the different applying timings for the frames according to the difference between the grayscale value of the present frame image and the grayscale value of the previous frame image.

19. The method of claim 16, wherein the grayscale value of the present frame image corresponds to an entire area of the display panel, and wherein the grayscale value of the previous frame image corresponds to the entire area of the display panel.

20. The method of claim 16, wherein the grayscale value of the present frame image corresponds to a central portion area of the display panel, and wherein the grayscale value of the previous frame image corresponds to the central portion area of the display panel.

* * * * *